(12) United States Patent
Sano et al.

(10) Patent No.: US 10,904,037 B2
(45) Date of Patent: Jan. 26, 2021

(54) RELAYING APPARATUS, RELAYING METHOD, AND RELAYING SYSTEM

(71) Applicant: FUJITSU LIMITED, Kawasaki (JP)

(72) Inventors: Takeshi Sano, Hino (JP); Ryuichi Matsukura, Kawasaki (JP); Shigeki Fukuta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 16/241,750

(22) Filed: Jan. 7, 2019

(65) Prior Publication Data
US 2019/0253280 A1    Aug. 15, 2019

(30) Foreign Application Priority Data
Feb. 15, 2018 (JP) ................. 2018-024744

(51) Int. Cl.
| | |
|---|---|
| *H04L 12/66* | (2006.01) |
| *H04L 29/08* | (2006.01) |
| *H04W 76/11* | (2018.01) |
| *H04W 88/16* | (2009.01) |
| *H04W 84/18* | (2009.01) |

(52) U.S. Cl.
CPC ............ *H04L 12/66* (2013.01); *H04L 67/025* (2013.01); *H04W 76/11* (2018.02); *H04W 88/16* (2013.01); *H04W 84/18* (2013.01)

(58) Field of Classification Search
CPC .... H04L 12/1403; H04M 15/00; H04W 88/12
See application file for complete search history.

(56) References Cited

U.S. PATENT DOCUMENTS

| | | | | |
|---|---|---|---|---|
| 8,610,546 | B2 * | 12/2013 | Brown | H04N 21/4126 340/12.22 |
| 2016/0164728 | A1 * | 6/2016 | Chakrabarti | H04W 4/70 370/254 |
| 2016/0270054 | A1 * | 9/2016 | Kim | H04W 74/0808 |
| 2016/0344593 | A1 * | 11/2016 | Ha | H04W 4/70 |
| 2016/0344841 | A1 * | 11/2016 | Wang | H04L 67/12 |
| 2017/0149614 | A1 * | 5/2017 | Zheng | H04L 63/101 |

(Continued)

FOREIGN PATENT DOCUMENTS

| | | |
|---|---|---|
| JP | 2003-249943 A | 9/2003 |
| JP | 2008-17122 A | 1/2008 |

*Primary Examiner* — Melanie Jagannathan
(74) *Attorney, Agent, or Firm* — Arent Fox LLP

(57) ABSTRACT

A relaying apparatus includes: a memory; and a processor coupled to the memory and configured to: acquire, from a gateway device, a resource identifier for a network resource provided from a device in a first network to a server in a second network through the gateway device, the resource identifier indicating a location in the second network of the network resource, relate a gateway identifier corresponding to an address of the gateway device included in the resource identifier to the resource identifier, receive, from the server, a request for the network resource to the device, detect, from a correspondence relationship between the gateway identifier and the resource identifier, the resource identifier corresponding to the gateway identifier specified in the request, and relay the request to the device through the gateway device in accordance with the resource identifier that has been detected.

13 Claims, 36 Drawing Sheets

(56) References Cited

U.S. PATENT DOCUMENTS

| | | | |
|---|---|---|---|
| 2017/0237815 A1* | 8/2017 | Arsenault | H04L 12/4633 |
| | | | 709/217 |
| 2018/0084073 A1* | 3/2018 | Walsh | H04L 67/2819 |
| 2018/0183889 A1* | 6/2018 | Meriac | H04L 67/26 |
| 2018/0227388 A1* | 8/2018 | Kuo | H04L 67/2823 |
| 2019/0075073 A1* | 3/2019 | Erickson | H04W 4/029 |
| 2019/0132412 A1* | 5/2019 | Chen | H04L 67/16 |
| 2019/0239068 A1* | 8/2019 | Mudulodu | H04L 9/3278 |
| 2019/0288869 A1* | 9/2019 | Chamarajnager | H04L 67/125 |
| 2020/0126050 A1* | 4/2020 | Savolainen | H04M 15/00 |

* cited by examiner

FIG. 5

DEVICE DEFINITION INFORMATION (S1)

```
POST  /gw1.exp.com/register HTTP/1.1
Accept: text/html,application/json
Accept-Language: ja, en-US
Connection: keep-alive
Host: gw1.exp.com
...
```

```
{
 "name" : "device1"
 ,"interactions" :
 [
   {
    "@type" : "Property"
    ,"name" : "temperature"
    ,"url" : "http://192.168.1.10/Things/Property/temp"
    ,"outputData" : {"type" : "number"}
   }
 ]
}
```

FIG. 6

| DEVICE ID | ATTRIB-UTE ID | URL |
|---|---|---|
| device1 | temperature | http://192.168.1.10/Things/Property/temp |

```
{"name":"device1"
,"interactions":
[
{"@type":"Property"
,"name":"temperature"
,"url":"http://gw1.exp.com/Things/device1/Property/temperature"
,"outputData":{"type":"number"}
}
]
}
```
~231

FIG. 8

DEVICE DEFINITION INFORMATION (S4)

```
POST /center.com/register HTTP/1.1
Accept: text/html,application/json
Accept-Language: ja, en-US
Connection: keep-alive
Host: center.com
...
```

```
{
  "name" : "device1",
  "interactions" :
  [
    {
      "@type" : "Property",
      "name" : "temperature",
      "url" : "http://gw1.exp.global.com/Things/device1/Property/temperature",
      "outputData" : {"type" : "number"}
    }
  ]
}
```

FIG. 9

| DEVICE ID | GWID | ATTRIBUTE ID | URL |
|---|---|---|---|
| device1 | gw1 | temperature | http://gw1.exp.global.com/Things/device1/Property/temperature |

130

| GWID | GW ADDRESS |
|---|---|
| gw1 | gw1.exp.global.com |

```
{
  "name" : "device1"
  ,"interactions" :
  [
    {
      "@type" : "Property"
      ,"name" : "temperature"
      ,"url" : "http://center.com/gw1/Things/device1/Property/temperature"
      ,"outputData" : {"type" : "number"}
    }
  [
  {
```

DEVICE CONTROL MSG (S9)

GET /center.com/gw1/Things/device1/Property/temperature HTTP/1.1
Accept: text/html,application/json
Accept-Language: ja, en-US
Connection: keep-alive
Host: center.com
...

FIG. 12

DEVICE CONTROL MSG (S11)

GET [/gw1.exp.global.com/Things/device1/Property/temperature] HTTP/1.1
Accept: text/html,application/json
Accept-Language: ja, en-US
Connection: keep-alive
Host: center.com
...

FIG. 13

DEVICE CONTROL MSG (S13)

GET /192.168.1.10/Things/Property/temp HTTP/1.1
Accept: text/html,application/json
Accept-Language: ja, en-US
Connection: keep-alive
Host: 192.168.1.10
...

FIG. 15

DEVICE DEFINITION INFORMATION (S1)

```
POST   /[fe80::ed87:66e3:4fb2:2b4f]/register HTTP/1.1
Accept: text/html,application/json
Accept-Language: ja, en-US
Connection: keep-alive
Host: [fe80::ed87:66e3:4fb2:2b4f]

{
"name" : "device1",
"interactions" :
[
  {
  "@type" : "Property",
  "name" : "temperature",
  "url" : "http://[fe80::ed87:66e3:4fb2:3a6g]/Things/Property/temp",
  "outputData" : {"type" : "number"}
  }
]
}
```

FIG. 16

| DEVICE ID | ATTRIBUTE ID | URL |
|---|---|---|
| device1 | temperature | http://[fe80::ed87:66e3:4fb2:3a6g]/Things/Property/temp |

```
                                                                    ⟵ 231
{"name" : "device1"
,"interactions" :
[
  {"@type" : "Property"
  ,"name" : "temperature"
  ,"url" :"http://[fe80::ed87:66e3:4fb2:2b4f]/Things/device1/Property/temperature"
  ,"outputData" : {"type" : "number"}
  }
]
}
```

FIG. 18

DEVICE DEFINITION INFORMATION (S4)

```
POST    /[2001:db8::123:4567:89ab:cdef]/register HTTP/1.1
Accept: text/html,application/json
Accept-Language: ja, en-US
Connection: keep-alive
Host: [2001:db8::123:4567:89ab:cdef]
...

{
 "name" : "device1",
 "interactions" :
 [
  {
   "@type" : "Property",
   "name" : "temperature",
   "url" : "http://[2001:db8::fedc:ba98:7654:3210]/Things/device1/Property/temperature",
   "outputData" : {"type" : "number"}
  }
 ]
}
```

FIG. 19

| DEVICE ID | GWID | ATTRIB-UTE ID | URL |
|---|---|---|---|
| device1 | gw2 | temperature | http://[2001:db8::fedc:ba98:7654:3210]/Things/device1/Property/temperature |

130

| GWID | GW ADDRESS |
|---|---|
| gw1 | [2001:db8::fedc:ba98:7654:3210] |

```
{"name" : "device1"
,"interactions" :
[
  {"@type" : "Property"
  ,"name" : "temperature"
  ,"url" :"http://[2001:db8::123:4567:89ab:cdef]/gw1/Things/device1/Property/temperature"
  ,"outputData" : {"type" : "number"}
  }
]
}
```
↖ 131

FIG. 21

DEVICE CONTROL MSG (S9)

GET /[2001:db8::123:4567:89ab:cdef]/gw1/Things/device1/Property/temperature HTTP/1.1
Accept: text/html,application/json
Accept-Language: ja, en-US
Connection: keep-alive
Host: [2001:db8::123:4567:89ab:cdef]
...

FIG. 22

DEVICE CONTROL MSG (S11)

GET /[2001:db8::fedc:ba98:7654:3210]/Things/device1/Property/temperature HTTP/1.1
Accept: text/html,application/json
Accept-Language: ja, en-US
Connection: keep-alive
Host: [2001:db8::fedc:ba98:7654:3210]
...

FIG. 23

DEVICE CONTROL MSG (S13)

GET /[fe80::ed87:66e3:4fb2:3a6g]/Things/Property/temp HTTP/1.1
Accept: text/html,application/json
Accept-Language: ja, en-US
Connection: keep-alive
Host: [fe80::ed87:66e3:4fb2:3a6g]
...

FIG. 25

```
{ "name" : "device1"
, "interactions" : [
  { "@type" : "Property"
  , "name" : "temperature"
  , "url" : "http://gw2.exp.com/Things/device1/Property/temperature"
  , "outputData" : {"type" : "number"}
  }
]}
```
↑ 231

FIG. 26

DEVICE DEFINITION INFORMATION (S24)

```
POST /gw1.exp.com/register HTTP/1.1
Accept: text/html,application/json
Accept-Language: ja, en-US
Connection: keep-alive
Host: gw1.exp.com
```
RQ / HD

```
gwid=gw2
thing={
 "name" : "device1",
 "interactions" :
 [
  {
   "@type" : "Property",
   "name" : "temperature",
   "url" : "http://gw2.exp.global.com/Things/device1/Property/temperature",
   "outputData" : {"type" : "number"}
  }
 ]
}
```
BD

FIG. 27

| DEVICE ID | GWID | ATTRIB-UTE ID | URL |
|---|---|---|---|
| device1 | gw2 | temperature | http://gw2.exp.global.com/Things/device1/Property/temperature |

```
{
  "name" : "device1"
  ,"interactions" :
  [
    {
      "@type" : "Property"
      ,"name" :"temperature"
      ,"url" :"http://gw1.exp.com/gw2/Things/device1/Property/temperature"
      ,"outputData" : {"type" : "number"}
    }
  ]
}
```
← 231

FIG. 29

DEVICE DEFINITION INFORMATION (S27)

```
POST /center.com/register HTTP/1.1
Accept: text/html,application/json
Accept-Language: ja, en-US
Connection: keep-alive
Host: center.com gwid=gw1gw2
thing={
 "name" : "device1",
 "interactions" :
 [
  {
   "@type" : "Property",
   "name" : "temperature",
   "url" :"http://gw1.exp.global.com/gw2/Things/device1/Property/temperature",
   "outputData" : {"type" : "number"}
  }
 ]
}
```

| DEVICE ID | GWID | ATTRIBUTE ID | URL |
|---|---|---|---|
| device1 | gw1gw2 | temperature | http://gw1.exp.global.com/gw2/Things/device1/Property/temperature |
| device2 | gw1gw3 | temperature | http://gw1.exp.global.com/gw3/Things/device2/Property/temperature |

```
{
  "name" : "device1"
  ,"interactions" :
  [
    {
      "@type" : "Property"
      ,"name" : "temperature"
      ,"url" :"http://center.com/gw1gw2/Things/device1/Property/temperature"
      ,"outputData" : {"type" : "number"}
    }
  ]
}
```

FIG. 33

DEVICE CONTROL MSG (S33)

GET /center.com/gw1gw2/Things/device1/Property/temperature HTTP/1.1
Accept: text/html,application/json
Accept-Language: ja, en-US
Connection: keep-alive
Host: center.com
...

FIG. 34

DEVICE CONTROL MSG (S35)

GET :/gw1.exp.global.com/gw2/Things/device1/Property/temperature: HTTP/1.1
Accept: text/html,application/json
Accept-Language: ja, en-US
Connection: keep-alive
Host: gw1.exp.global.com
...

FIG. 35

DEVICE CONTROL MSG (S37)

GET /gw2.exp.global.com/Things/device1/Property/temperature HTTP/1.1
Accept: text/html,application/json
Accept-Language: ja, en-US
Connection: keep-alive
Host: gw2.exp.global.com
...

FIG. 36

DEVICE CONTROL MSG (S39)

GET /192.168.1.10/Things/Property/temp HTTP/1.1
Accept: text/html,application/json
Accept-Language: ja, en-US
Connection: keep-alive
Host: 192.168.1.10
...

RELAYING APPARATUS, RELAYING METHOD, AND RELAYING SYSTEM

CROSS-REFERENCE TO RELATED APPLICATION

This application is based upon and claims the benefit of priority of the prior Japanese Patent Application No. 2018-024744 filed on Feb. 15, 2018, the entire contents of which are incorporated herein by reference.

FIELD

A certain aspect of the embodiments is related to a relaying apparatus, a relaying method, and a relaying system.

BACKGROUND

The Internet of Things (IoT) technology allows a server on the Internet to acquire specific information from various devices such as sensors to provide a service, for the purpose of, for example, improvements in the production efficiency of the factory, the qualities of products, and the energy utilization efficiency. This type of device communicates according to various communication protocols depending on various communication methods such as, for example, Bluetooth Low Energy (BLE: registered trademark) and a Local Area Network (LAN).

For example, the control of various devices by the interface unified by Web technologies such as Hyper Text Transfer Protocol (HTTP) and JavaScript (registered trademark) Object Notation (JSON) facilitates the use of the devices. To access a device from a server through a Web interface, device definition information such as, for example, a Uniform Resource Locator (URL) is used.

However, even when the URL, which is the device definition information, is used, access to the device may be impossible. When the server is connected to a network (for example, the Internet) different from the network to which the device is connected, the server cannot communicate beyond, for example, Network Address Translation (NAT). Thus, the server cannot directly access the device in accordance with the URL.

To achieve communication beyond NAT, for example, Japanese Patent Application Publication No. 2008-17122 (hereinafter, referred to as Patent Document 1) describes that a mediation server between gateway devices relates the port number corresponding to the local address of a device under each gateway device to the global address of each gateway device.

SUMMARY

According to a first aspect of the embodiments, there is provided a relaying apparatus including: a memory; and a processor coupled to the memory and configured to: acquire, from a gateway device, a resource identifier for a network resource provided from a device in a first network to a server in a second network through the gateway device, the resource identifier indicating a location in the second network of the network resource, relate a gateway identifier corresponding to an address of the gateway device included in the resource identifier to the resource identifier, receive, from the server, a request for the network resource to the device, detect, from a correspondence relationship between the gateway identifier and the resource identifier, the resource identifier corresponding to the gateway identifier specified in the request, and relay the request to the device through the gateway device in accordance with the resource identifier that has been detected.

According to a second aspect of the embodiments, there is provided a relaying method including: acquiring, from a gateway device, a resource identifier for a network resource provided from a device in a first network to a server in a second network through the gateway device, the resource identifier indicating a location in the second network of the network resource, relating a gateway identifier corresponding to an address of the gateway device included in the resource identifier to the resource identifier, receiving, from the server, a request for the network resource to the device, detecting, from a correspondence relationship between the gateway identifier and the resource identifier, the resource identifier corresponding to the gateway identifier specified in the request, and relaying the request to the device through the gateway device in accordance with the resource identifier that has been detected.

According to a third aspect of the embodiments, there is provided a relaying system including: a gateway device configured to communicate with a device in a first network; and a relaying apparatus configured to relay communication between a server in a second network and the device through the gateway device, wherein the gateway device is further configured to: acquire, from the device, a first resource identifier for a network resource provided from the device to the server through the gateway device, and a device identifier to identify the device, the first resource identifier indicating a location in the first network of the network resource, relate the device identifier to the first resource identifier, generate, from the first resource identifier, a second resource identifier, which indicates a location in the second network of the network resource, the relaying apparatus is further configured to: acquire the second resource identifier from the gateway device, relate a gateway identifier corresponding to an address of the gateway device included in the second resource identifier to the second resource identifier, receive, from the server, a request for the network resource to the device, detect, from a correspondence relationship between the gateway identifier and the second resource identifier, the second resource identifier corresponding to the gateway identifier specified in the request, relay the request to the gateway device in accordance with the second resource identifier that has been detected, and the gateway device is further configured to: receive the request from the relaying apparatus, detect the first resource identifier corresponding to the device identifier specified in the request from a correspondence relationship between the device identifier and the first resource identifier, and relay the request to the device in accordance with the first resource identifier that has been detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a message of device definition information transmitted from the IoT device;

FIG. 6 illustrates a URL conversion table of the gateway device;

FIG. 7 illustrates device definition information stored in a device definition information database of the gateway device;

FIG. 8 illustrates a message of device definition information transmitted from the gateway device;

FIG. 9 illustrates a URL conversion table and a GWID database of the relaying server;

FIG. 10 illustrates device definition information stored in a device definition information database of the relaying server;

FIG. 11 is a device control message transmitted from the IoT server;

FIG. 12 illustrates a device control message transmitted from the relaying server;

FIG. 13 illustrates a device control message transmitted from the gateway device;

FIG. 15 illustrates another example of the message of the device definition information transmitted from the IoT device;

FIG. 16 illustrates another example of the URL conversion table of the gateway device;

FIG. 17 illustrates another example of the device definition information stored in the device definition information database of the gateway device;

FIG. 18 illustrates another example of the message of the device definition information transmitted from the gateway device;

FIG. 19 illustrates another example of each of the URL conversion table and the GWID database of the relaying server;

FIG. 20 illustrates another example of the device definition information stored in the device definition information database of the relaying server;

FIG. 21 illustrates another example of the device control message transmitted from the IoT server;

FIG. 22 illustrates another example of the device control message transmitted from the relaying server;

FIG. 23 illustrates another example of the device control message transmitted from the gateway device;

FIG. 25 illustrates the device definition information stored in the device definition information database of the gateway device;

FIG. 26 illustrates the message of the device definition information transmitted from the gateway device;

FIG. 27 illustrates the URL conversion table of the gateway device;

FIG. 28 illustrates the device definition information stored in the device definition information database of the gateway device;

FIG. 29 illustrates the message of the device definition information transmitted from the gateway device;

FIG. 30 illustrates the URL conversion table of the relaying server;

FIG. 31 illustrates the device definition information stored in the device definition information database of the relaying server;

FIG. 33 illustrates a device control message transmitted from the IoT server;

FIG. 34 illustrates a device control message transmitted from the relaying server;

FIG. 35 illustrates a device control message transmitted from the gateway device: and FIG. 36 illustrates a device control message transmitted from the gateway device.

DESCRIPTION OF EMBODIMENTS

According to the an of the Patent Document 1, when accessing devices under the gateway device from an external network, it is necessary to inform the external network of the global address of the gateway device in advance. Thus, for example, the global address may leak out to a malicious user, and the device may be attacked through the gateway device.

Figure 1:
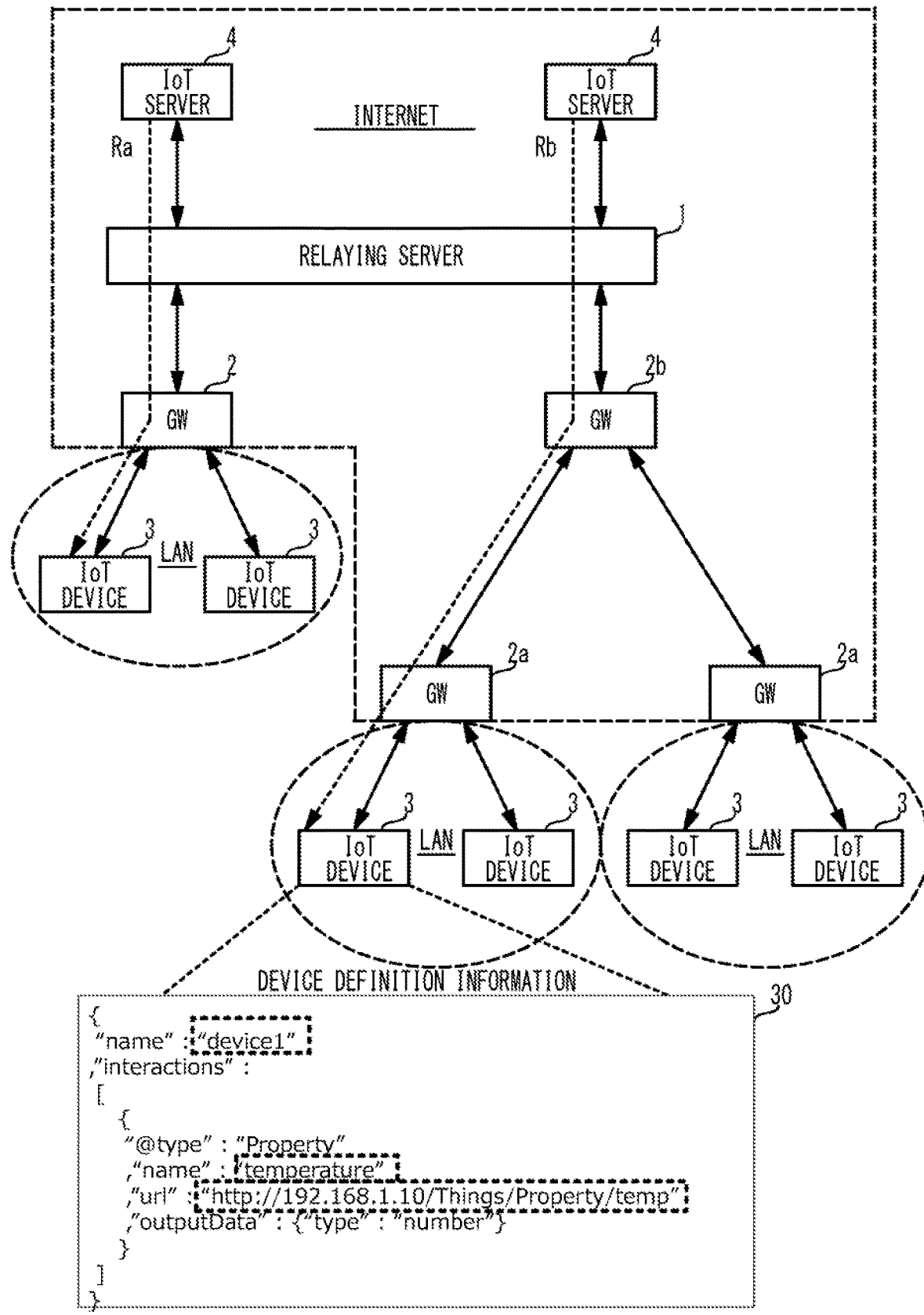
FIG. 1 is a configuration diagram illustrating a relaying system.

FIG. 1 is a configuration diagram illustrating a relaying system. The relaying system relays communication between IoT servers 4 in the Internet and IoT devices 3 in each LAN. The relaying system includes a relaying server 1 and gateway devices (GWs) 2, 2a, and 2b in the Internet. The LAN is an example of a first network, and the Internet is an example of a second network.

The IoT device 3 is an example of a device, and communicates with the gateway device 2, 2a, 2b. The IoT device 3 is, for example, a temperature sensor. Measurement data of temperature is provided from the IoT device 3 to the IoT server 4 through the gateway device 2 or the gateway devices 2a and 2b and the relaying server 1. The IoT server 4 uses the measurement data of temperature provided from the IoT device 3 to provide a predetermined service. The measurement data of temperature is an example of a network resource. Examples of the network resource provided from the IoT device 3 are not limited to the measurement data of temperature, and include, but are not limited to, measurement data of humidity and wind speed.

The IoT server 4 is an example of a server, and accesses the IoT device 3 through a Web interface. Thus, each IoT device 3 provides device definition information 30. The device definition information 30 includes, as indicated by dotted-line frames, a device ID "device1" to identify the IoT device 3, an attribute ID "temperature", which indicates the attribute of the network resource, and the URL "http://192.168.1.10/Things/Property/temp" of the network resource. The device ID is an example of a device identifier, the attribute ID is an example of an attribute identifier, and the URL is an example of a resource identifier.

However, the IoT server 4 is connected to the Internet different from a LAN that is a local network. The IoT server 4 cannot communicate beyond, for example, NAT. Thus, the IoT server 4 cannot directly access the IoT device 3 in accordance with the URL of the device definition information 30.

Thus, the relaying server 1 that relays communication between the IoT server 4 and the IoT device 3 through the gateway device 2 or the gateway devices 2a and 2b is provided between the IoT server 4 and the gateway device 2 and the gateway devices 2a and 2b. The relaying server 1 has a function of generating a URL conversion table from the device definition information in advance, and converting the URL in accordance with the URL conversion table. In addition, each of the gateway devices 2, 2a, and 2b has a function of converting the URL on the basis of the device definition information.

The relaying server 1 is an example of a relaying apparatus, and receives, from the IoT server 4, a request to the IoT device 3 through the URL including a gateway identifier (GWID) to identify the gateway device 2, 2a, 2b, and converts the URL on the basis of the GWID. Thus, the relaying server 1 does not need to inform the IoT server 4 of the global addresses of the gateway devices 2, 2a, and 2b. Therefore, the security risk in the relaying process is reduced.

The IoT server 4 may access the IoT device 3 through the relaying server 1 and the gateway device 2 as indicated by the path Ra, or may access the IoT device 3 through the relaying server 1 and two gateway devices 2a and 2b as indicated by the path Rb. The gateway device 2a is an example of a first gateway device, and is located in the lower node of the gateway device 2b. The gateway device 2b is an example of a second gateway device.

Figure 2:
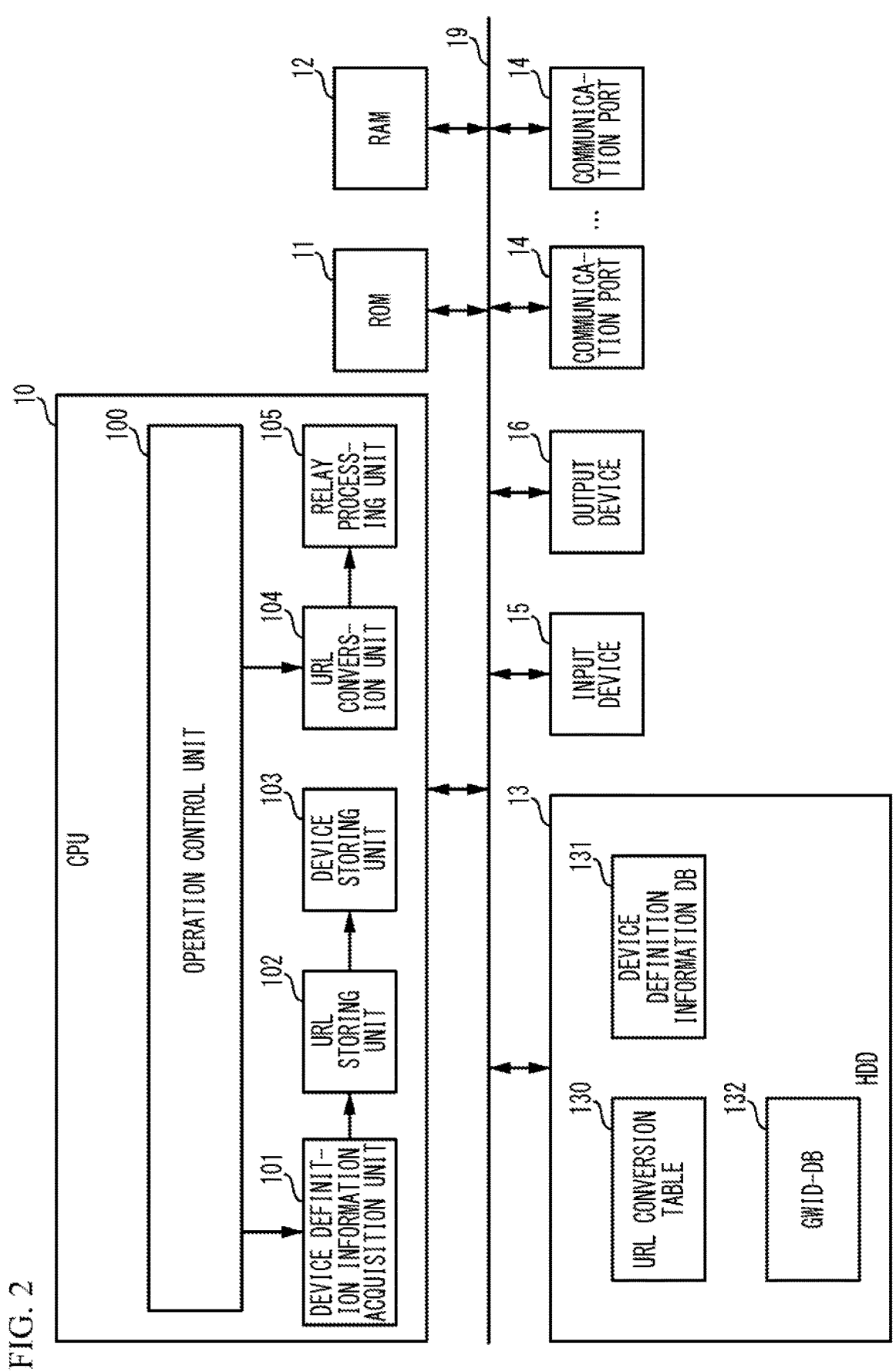
FIG. 2 is a configuration diagram illustrating a relaying server.

FIG. 2 is a configuration diagram illustrating the relaying server 1. The relaying server 1 includes a Central Processing Unit (CPU) 10, a Read Only Memory (ROM) 11, a Random Access Memory (RAM) 12, a Hard Disk Drive (HDD) 13, communication ports 14, an input device 15, and an output device 16. The CPU 10 is coupled to the ROM 11, the RAM 12, the HDD 13, the communication ports 14, the input device 15, and the output device 16 through a bus 19 so that signals are transmitted and received to and from each other.

The ROM 11 stores a program for driving the CPU 10. The RAM 12 functions as a working memory for the CPU 10. Examples of the communication ports 14 include, but are not limited to, a wireless LAN card and a Network Interface Card (NIC). The communication ports 14 transmit and receive packets to and from the IoT servers 4 and the gateway devices 2 and 2b. Examples of the packet include, but are not limited to, an Internet Protocol (IP) packet.

The input device 15 is a device for inputting information to the relaying server 1. Examples of the input device 15 include, but are not limited to, a keyboard, a mouse, and a touch panel. The input device 15 outputs the input information to the CPU 10 through the bus 19.

The output device 16 is a device for outputting information on the relaying server 1. Examples of the output device 16 include, but are not limited to, a display. The output device 16 acquires information from the CPU 10 through the bus 19, and outputs the acquired information.

The HDD 13 stores a URL conversion table 130, a device definition information database (DB) 131, and a GWID database (GWID-DB) 132. The URL conversion table 130 is an example of a table showing a correspondence relationship between the GWID and the URL, and is used for URL conversion.

The device definition information of the IoT device 3 is stored in the device definition information DB 131. Correspondence relationships between the GWID, the device ID, and the attribute ID and the URLs of the gateway devices 2 and 2a are stored in the GWID-DB 132. The URL conversion table 130, the device definition information DB 131, and the GWID-DB 132 may not be necessarily stored in the HDD 13, and may be stored in other storage devices (such as a memory) inside or outside the relaying server 1.

When the CPU 10 reads a program from the ROM 11, an operation control unit 100, a device definition information acquisition unit 101, a URL storing unit 102, a device storing unit 103, a URL conversion unit 104, and a relay processing unit 105 are formed as functions. The operation control unit 100, the device definition information acquisition unit 101, the URL storing unit 102, the device storing unit 103, the URL conversion unit 104, and the relay processing unit 105 may not necessarily be functions of software, and may be a circuit composed of a hardware device, such as, for example, a Field Programmable Gate Array (PPGA).

The operation control unit 100 controls the overall operation of the relaying server 1. The operation control unit 100 issues an instruction on operation to the device definition information acquisition unit 101 before the relay processing is started.

The device definition information acquisition unit 101 is an example of a second acquisition unit, and acquires the device definition information of the IoT device 3 from the gateway device 2, 2b through the communication port 14. The device definition information includes a URL, which is an example of a second resource identifier or a third resource identifier, the device ID, and the attribute ID. The URL indicates the location in the Internet of the network resource of the IoT device 3, and the URL includes the global address of the gateway device 2, 2b. The device definition information is output from the device definition information acquisition unit 101 to the URL storing unit 102.

The URL storing unit 102 is an example of a second identifier processing unit, and relates the GWID, the device ID, and the attribute ID corresponding to the address of the gateway device 2, 2b included in the URL to the URL. More specifically, the URL storing unit 102 stores a correspondence relationship between the GWID, the device ID, and the attribute ID and the URL in the URL conversion table 130 on the basis of the device definition information.

At this time, the URL storing unit 102 retrieves the GWID corresponding to the global address of the gateway device 2, 2b included in the URL from the GWID-DB 132. When the GWID corresponding to the global address is not stored in the GWID-DB 132 yet, the URL storing unit 102 allocates a new GWID to the global address. The global address is an example of an address. The device definition information is output from the URL storing unit 102 to the device storing unit 103.

The device storing unit 103 generates, from the URL of the device definition information, the URL indicating the location in the Internet of the network resource with reference to the relaying server 1. The generated URL includes the GWID, the device ID, and the attribute ID. The device storing unit 103 updates the device definition information with the newly-generated URL, and stored the updated device definition information in the device definition information DB 131. The operation control unit 100 informs the IoT server 4 of the device definition information in the device definition information DB 131.

In addition, the operation control unit 100 receives, from the IoT server 4, a request for a network resource to the IoT device 3 through the communication port 14. The network resource is requested through a device control message (MSG) configured as, for example, an HTTP request. The operation control unit 100 outputs the device control MSG to the URL conversion unit 104.

The URL conversion unit 104 receives the device control MSG, and converts the URL included in the device control MSG on the basis of the URL conversion table 130. The GWID, the device ID, and the attribute ID are specified in the URL included in the device control MSG in accordance with the device definition information informed in advance.

The URL conversion unit 104 is an example of a first detecting unit, and detects the URL corresponding to the GWID, the device ID, and the attribute ID specified in the device control MSG on the basis of the correspondence relationship between the GWID, the device ID, and the attribute ID and the URL. More specifically, the URL conversion unit 104 detects the URL corresponding to the GWID, the device ID, and the attribute ID from the URL conversion table 130. Thus, the URL conversion unit 104 is able to retrieve the URL from the URL conversion table 130 quickly. The retrieved URL and the device control MSG are output from the URL conversion unit 104 to the relay processing unit 105.

The relay processing unit 105 is an example of a first relay unit, and relays the device control MSG to the IoT device 3 through the gateway device 2 or the gateway devices 2a and 2b in accordance with the URL detected by the URL conversion unit 104. More specifically, the relay processing unit 105 replaces the URL of the device control MSG received from the IoT server 4 with the URL retrieved from the URL conversion table 130, and transmits the device control MSG of which the URL has been replaced from the communication port 14 to the gateway device 2, 2a.

Figure 3:
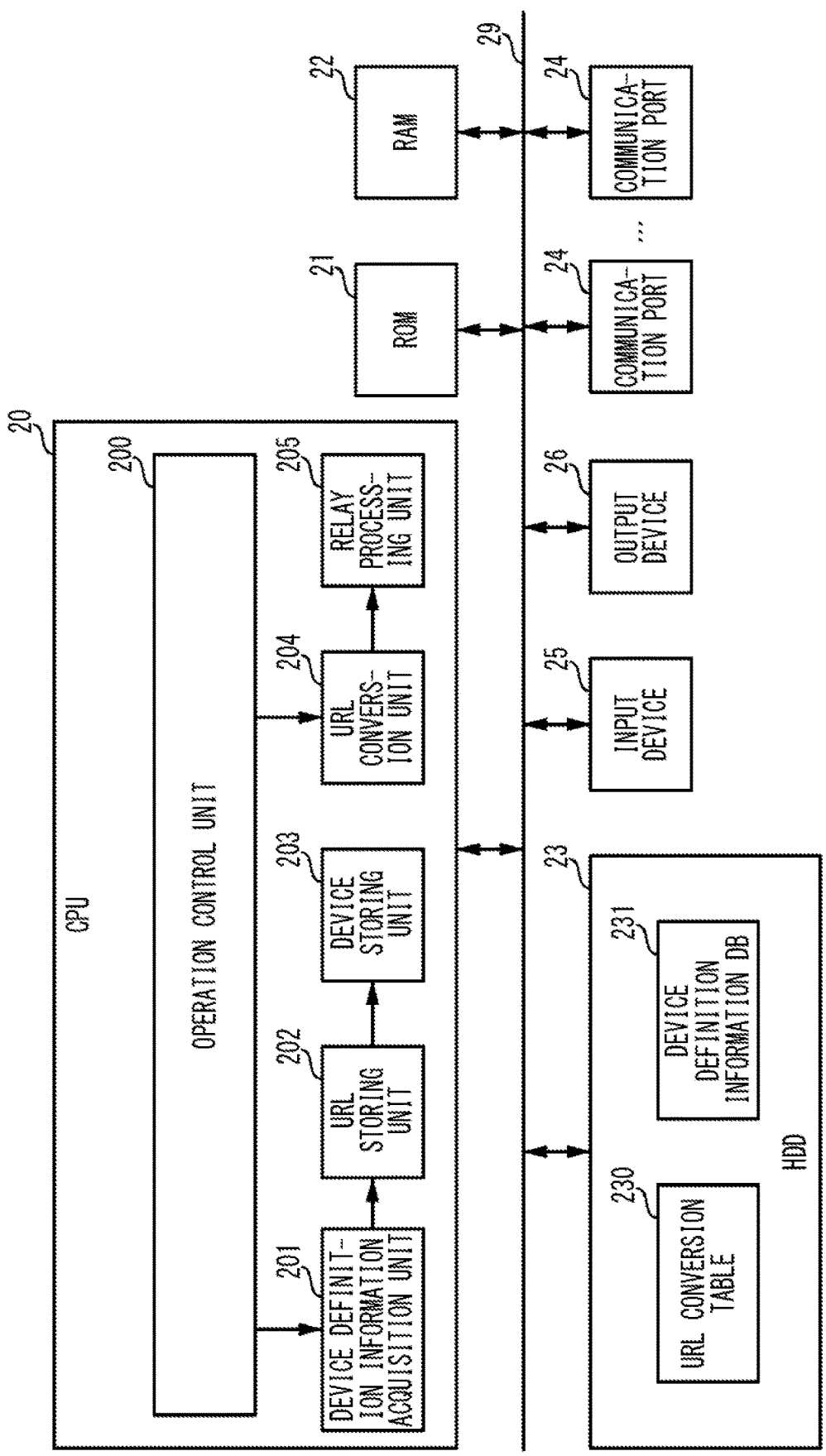
FIG. 3 is a configuration diagram illustrating a gateway device.

FIG. 3 is a configuration diagram illustrating the gateway devices 2, 2a, and 2b. Each of the gateway devices 2, 2a, and 2b includes a CPU 20, a ROM 21, a RAM 22, an HDD 23, communication ports 24, an input device 25, and an output device 26. The CPU 20 is coupled to the ROM 21, the RAM 22, the HDD 23, the communication ports 24, the input device 25, and the output device 26 through a bus 29 so that signals are transmitted and received to and from each other.

The ROM 21 stores a program for driving the CPU 20. The RAM 22 functions as a working memory for the CPU 20. Examples of the communication ports 24 include, but are not limited to a wireless LAN card and an NIC. The communication ports 24 transmit and receive packets to and from the relaying server 1, the IoT device 3, or the gateway device 2a located in the lower node.

The input device 25 is a device for inputting information to the gateway device 2, 2a, 2b. Examples of the input device 25 include, but are not limited to, a keyboard, a mouse, and a touch panel. The input device 25 outputs the input information to the CPU 20 through the bus 29.

The output device 26 is a device for outputting information on the gateway device 2, 2a, 2b. Examples of the output device 26 include, but are not limited to, a display. The output device 26 acquires information from the CPU 20 through the bus 29, and outputs the acquired information.

The HDD 23 stores a URL conversion table 230 and a device definition information database (DB) 231. The URL conversion table 230 is used for URL conversion. The device definition information of the IoT device 3 is stored in the device definition information DB 231. The URL conversion table 230 and the device definition information DB 231 may not be necessarily stored in the HDD 23, and may be stored in other storage devices (for example, a memory) inside or outside the gateway device 2, 2a, 2b.

When the CPU 20 reads a program from the ROM 21, an operation control unit 200, a device definition information acquisition unit 201, a URL storing unit 202, a device storing unit 203, a URL conversion unit 204, and a relay processing unit 205 are formed as functions. The operation control unit 200, the device definition information acquisition unit 201, the URL storing unit 202, the device storing unit 203, the URL conversion unit 204, and the relay processing unit 205 may not be necessarily functions of software, and may be a circuit composed of a hardware device such as, for example, an FPGA.

The operation control unit 200 controls the overall operation of the gateway device 2, 2a, 2b. The operation control unit 200 issues an instruction on operation to the device definition information acquisition unit 201 before the relay processing is started.

In each of the gateway devices 2 and 2a, the device definition information acquisition unit 201 is an example of a first acquisition unit, and acquires the device definition information of the IoT device 3 from the IoT device 3 through the communication port 14. The device definition information includes a URL, which is an example of a first resource identifier, the device ID, and the attribute ID. The URL indicates the location in the LAN of the network resource of the IoT device 3, and the URL includes the local address in the LAN of the IoT device 3.

In the gateway device 2b, the device definition information acquisition unit 201 acquires the device definition information of the IoT device 3 from the gateway device 2a through the communication port 14. The device definition information includes a URL, which is an example of a second resource identifier, the device ID, and the attribute ID. The URL indicates the location in the Internet of the network resource of the IoT device 3 with reference to the gateway device 2a, and the URL includes the global address of the gateway device 2a. The device definition information is output from the device definition information acquisition unit 201 to the URL storing unit 202.

In each of the gateway devices 2 and 2a, the URL storing unit 202 is an example of a first identifier processing unit, and relates the device ID and the attribute ID to the URL. More specifically, the URL storing unit 202 stores the correspondence relationship between the device ID and the attribute ID and the URL in the URL conversion table 230 on the basis of the device definition information.

In the gateway device 2b, the URL storing unit 202 relates the device ID, the attribute ID, and the GWID to the URL. More specifically, the URL storing unit 202 stores a correspondence relationship between the device ID, the attribute ID, and the GWID and the URL in the URL conversion table 230 on the basis of the device definition information. Here, the GWID is specified in, for example, the device definition information acquired from the gateway device 2a. The device definition information is output from the URL storing unit 202 to the device storing unit 203.

The device storing unit 203 generates, from the URL of the device definition information, the URL indicating the location in the Internet of the network resource with reference to the gateway device 2, 2a, 2b. This URL includes the address, the device ID, and the attribute ID of the gateway device 2, 2a. The device storing unit 203 updates the device definition information with the newly-generated URL, and stores the updated device definition information in the device definition information DB 231.

The operation control unit 200 informs the IoT server 4 or the gateway device 2b of the device definition information in the device definition information DB 231. At this time, the operation control unit 200 converts the address in the URL into the global address, and informs the IoT server 4 or the gateway device 2b of the device definition information in which the address in the URL has been convened into the global address. The operation control unit 200 is an example of a generating unit, and generates, from the URL of the device definition information acquired by the device definition information acquisition unit 201, the URL indicating the location in the Internet of the network resource with reference to the gateway device 2, 2a, 2b.

The operation control unit 200 receives, from the IoT server 4, a request for the network resource to the IoT device 3 through the communication port 24. The network resource is requested through a device control message (MSG) configured as, for example, an HTTP request. The operation control unit 200 outputs the device control MSG to the URL conversion unit 204.

The URL conversion unit 204 receives the device control MSG, and converts the URL included in the device control MSG on the basis of the URL conversion table 230. The URL conversion unit 204 extracts the device ID and the attribute ID from the URL in the device control MSG, and detects the URL corresponding to the device ID and the attribute ID from the correspondence relationship between the device ID and the attribute ID and the URL.

More specifically, the URL conversion unit 204 detects the URL corresponding to the device ID and the attribute ID from the URL conversion table 230. Thus, the URL conversion unit 204 is able to retrieve the URL from the URL conversion table 230 quickly. In each of the gateway devices 2 and 2a, the URL conversion unit 204 is an example of a second detecting unit. The retrieved URL and the device control MSG are output from the URL conversion unit 204 to the relay processing unit 205.

The relay processing unit 205 relays the device control MSG to the gateway device 2a or the IoT device 3 in accordance with the URL detected by the URL conversion unit 204. More specifically, the relay processing unit 205 replaces the URL of the device control MSG with the URL retrieved from the URL conversion table 230, and transmits, from the communication port 14 to the IoT device 3 or the gateway device 2a, the device control MSG of which the URL has been replaced. In each of the gateway devices 2 and 2a, the relay processing unit 205 is an example of a second relay unit.

Next, with use of an example of the access along the path Ra presented in FIG. 1, the operation of the relaying system will be described.

Figure 4:
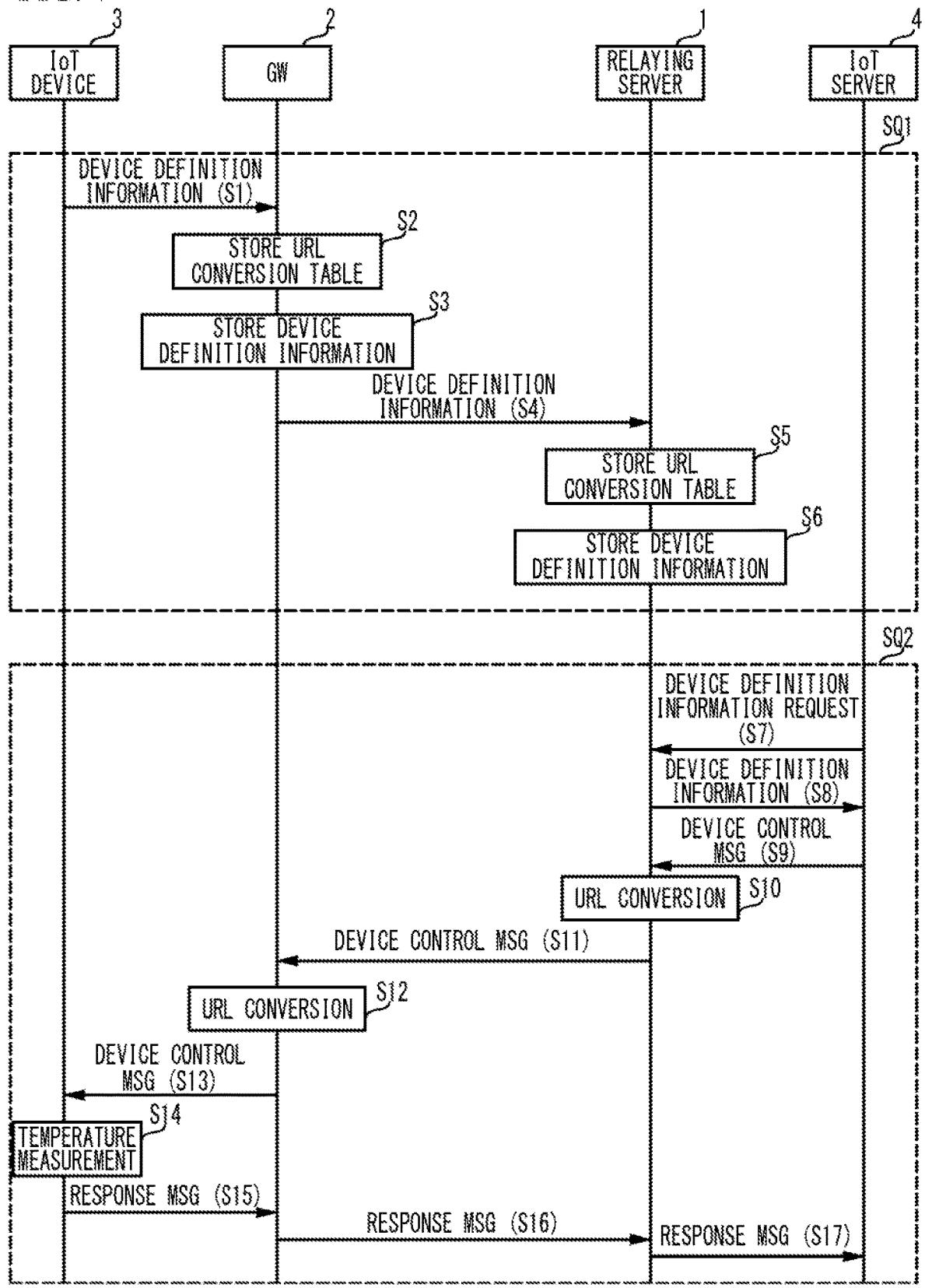
FIG. 4 is a sequence diagram illustrating communication among an IoT device, the gateway device, the relaying server, and an IoT server.

FIG. 4 is a sequence diagram illustrating communication among the IoT device 3, the gateway device 2, the relaying server 1, and the IoT server 4. First, the gateway device 2 and the relaying server 1 execute a storing sequence SQ1 of the device definition information of the IoT device 3. Hereinafter, the storing sequence SQ1 will be described with reference to FIG. 5 through FIG. 10 as appropriately.

The IoT device 3 transmits a message S1 including the device definition information to the gateway device 2. At this time, the IoT device 3 generates the message S1 on the basis of the device definition information 30 presented in FIG. 1, and transmits the generated message S1.

FIG. 5 illustrates the message S1 including the device definition information transmitted from the IoT device 3. The message S1 includes a request line RQ, a message header HD, and a message body BD.

The request line RQ includes information on the address and the protocol of the gateway device 2 that is the destination. The message header HD includes information on a language, a connection, and a host. The message body BD includes device definition information including, as indicated by dotted-line frames, the device ID "device1", the attribute JD "temperature" and the URL "http://192.168.1.10/Things/Property/temp".

In the gateway device 2, the device definition information acquisition unit 201 acquires the device definition information in the message S1 from the IoT device 3. The URL storing unit 202 relates the device ID "device1" and the attribute ID "temperature" in the device definition information to the URL "http://192.168.1.10/Things/Property/temp", and stores the correspondence relationship in the URL conversion table 230 (reference character S2).

FIG. 6 illustrates the URL conversion table 230 of the gateway device 2. The device ID "device1", the attribute ID "temperature", and the URL "http://192.168.1.10/Things/Property/temp" are related to each other and stored in the URL conversion table 230.

The device storing unit 203 of the gateway device 2 then stores the device definition information in the device definition information DB 231 (reference character S3).

FIG. 7 illustrates the device definition information stored in the device definition information DB 231 of the gateway device 2. The device definition information DB 231 includes the device definition information including, as indicated by dotted-line frames, the device ID "device1", the attribute ID "temperature", and the URL "http://gw1.exp.com/Thingsidevice1/Property/temperature". Here, "gw1.exp.com" included in the URL is the local address in the LAN of the gateway device 2.

In the above described manner, the device storing unit 203 changes the address part of the URL acquired from the IoT device 3 from the local address "192.168.1.10" of the IoT device 3 to the local address "gw1.exp.com" of the gateway device 2, and stores the device definition information in which the address part of the URL has been changed.

Then, the operation control unit 200 of the gateway device 2 transmits a message S4 including the device definition information to the relaying server 1.

FIG. 8 illustrates the message S4 including the device definition information transmitted from the gateway device 2. The message S4 includes a request line RQ, a message header HD, and a message body BD.

The message body BD includes the device definition information including, as indicated by dotted-line frames, the device ID "device", the attribute ID "temperature", and the URL "http://gw1.exp.global.com/Things/device1/Property/temperature". Here, "gw1.exp.global.com" included in the URL is the global address in the Internet of the gateway device 2.

The operation control unit 200 changes the address part of the stored URL from the local address "gw1.exp.com" to the global address "gw1.exp.global.com" in the message S4 to enable the access from the relaying server 1 in the Internet. As described above, the operation control unit 200 generates, from the URL acquired from the IoT device 3, the URL indicating the location in the Internet of the network resource.

In the relaying server 1, the device definition information acquisition unit 101 acquires the device definition information in the message S4 from the gateway device 2. The URL storing unit 102 extracts the global address "gw1.exp.global.com" (hereinafter, described as "GW address") of the gateway device 2 from the URL "http://gw1.exp.global.com/Things/device1/Property/temperature" of the device definition information.

The URL storing unit 102 retrieves the GWID corresponding to the GW address "gw1.exp.global.com" from the GWID-DB 132. The URL storing unit 102 relates the GWID, the device ID, and the attribute ID to the URL, and stores the correspondence relationship in the URL conversion table 130 (reference character S5).

FIG. 9 illustrates the URL conversion table 130 and the GWID-DB 132 of the relaying server 1. The GWID and the GW address are related to each other, and are stored in the GWID-DB 132.

The URL storing unit 102 searches the GWID-DB 132 by using the GW address "gw1.exp.global.com" extracted from the URL as a key, and acquires the GWID "gw1". When the GWID corresponding to the GW address "gw1.exp.global.com" is not present in the GWID-DB 132, the URL storing unit 102 may newly add the GWID "gw1" to the GWID-DB 132.

The URL storing unit 102 relates the GWID "gw1", the device ID "device1", and the attribute ID "temperature" to the URL "http://gw1.exp.global.com/Things/device1/Property/temperature", and stores them in the URL conversion table 130. Accordingly, the relaying server 1 is able to manage the URL of the gateway device 2 by the GWID.

Then, the device storing unit 103 stores the device definition information in the device definition information DB 131 (reference character S6). The device storing unit 103 rewrites the URL with use of the address in the Internet of the relaying server 1 and the GWID to enable the access from the IoT server 4.

FIG. 10 illustrates the device definition information stored in the device definition information DB 131 of the relaying server 1. The device definition information DB 131 includes the device definition information including, as indicated by dotted-line frames, the device ID "device1", the attribute ID "temperature", and the URL "http://center.com/gw1/Things/device1/Property/temperature". Here, "center.com" included in the URL is the address in the Internet of the relaying server 1. In addition, "gw1" is the GWID corresponding to the GW address in the GWID-DB 132.

As described above, the device storing unit 103 changes the address part of the URL acquired from the gateway device 2 from the GW address "gw1.exp.global.com" to the address "center.com" of the relaying server 1 and the GWID "gw1", and then stores the device definition information in which the address part of the URL has been changed. Thus, the device storing unit 103 is able to define the URL of the network resource by the path using the GWID with reference to the relaying server 1. The storing sequence SQ1 is executed in the above-described manner.

Then, executed is a control sequence SQ2 in which the IoT server 4 requests the network resource (measurement data of temperature) from the IoT device 3 and acquires the network resource (measurement data of temperature) from the IoT device 3. Hereinafter, the control sequence SQ2 will be described with reference to FIG. 11 through FIG. 14 as appropriately.

The IoT server 4 transmits a message S7 that requests the device definition information of the IoT device 3 to the relaying server 1 prior to the request for the network resource. In the relaying server 1, the operation control unit 100 transmits a message S8 including the device definition information to the IoT server 4 in response to the message S7. The device definition information in the message S8 is as illustrated in FIG. 10.

The IoT server 4 then transmits the device control MSG (S9) to the relaying server 1 on the basis of the device definition information in the message S8 received from the relaying server 1.

FIG. 11 illustrates the device control MSG (S9) transmitted from the IoT server 4. The device control MSG (S9) includes the URL "http://center.com/gw1/Things/device1/Property/temperature", which is identical to the URL illustrated in FIG. 10, as indicated by a dotted-line frame.

The relaying server 1 converts the URL of the device control MSG (S9) in accordance with the URL conversion table 130 (reference character S10). When receiving the device control MSG (S9), the URL conversion unit 104 acquires the GWID, the device ID, and the attribute ID specified in the device control MSG (S9). More specifically, the URL conversion unit 104 acquires the GWID "gw1", the device ID "device1", and the attribute ID "temperature" from the URL "http://center.com/gw1/Things/device1/Property/temperature" of the device control MSG (S9).

The URL conversion unit 104 retrieves the URL "http://gw1.exp.global.com/Things/device1/Property/temperature" corresponding to the GWID "gw1", the device ID "device1", and the attribute ID "temperature" from the URL conversion table 130. Through this process, the URL conversion unit 104 converts the URL of the device control MSG (S9). Then, the relay processing unit 105 generates a new device control MSG (S11) by replacing the URL of the device control MSG (S9) with the converted URL, and transmits the device control MSG (S11) to the gateway device 2.

FIG. 12 illustrates the device control MSG (S11) transmitted from the relaying server 1. The converted URL "http://gw1.exp.global.com/Things/device1/Property/temperature" is specified in the device control MSG (S11).

The gateway device 2 converts the URL of the device control MSG (S11) in accordance with the URL conversion table 230 (reference character S12). When receiving the device control MSG (S11), the URL conversion unit 204 acquires the device ID and the attribute ID specified in the device control MSG (S11). More specifically, the URL conversion unit 204 acquires the device ID "device1" and the attribute ID "temperature" from the URL "http://gw1.exp.global.com/Things/device1/Property/temperature" of the device control MSG (S11).

The URL conversion unit 204 retrieves the URL "http://192.168.1.10/Things/device1/Property/temp" corresponding to the device ID "device1" and the attribute ID "temperature" from the URL conversion table 230. Through this process, the URL conversion unit 204 converts the URL of the device control MSG (S11). Then, the relay processing unit 205 generates a new device control MSG (S13) by replacing the URL of the device control MSG (S11) with the converted URL, and transmits the device control MSG (S13) to the IoT device 3.

FIG. 13 illustrates the device control MSG (S13) transmitted from the gateway device 2. The converted URL "http://192.168.1.10/Things/Property/temp" is specified in the device control MSG (S13).

When receiving the device control MSG (S13), the IoT device 3 measures temperature (reference character S14). The IoT device 3 generates a response message (MSG) S15 including measurement data of temperature, and transmits the response MSG (S15) to the gateway device 2. The gateway device 2 transmits a response MSG (S16) to the relaying server 1 in response to the reception of the response MSG (S15). The relaying server 1 transmits a response MSG (S17) to the IoT server 4 in response to the reception of the response MSG (S16).

Figure 14:
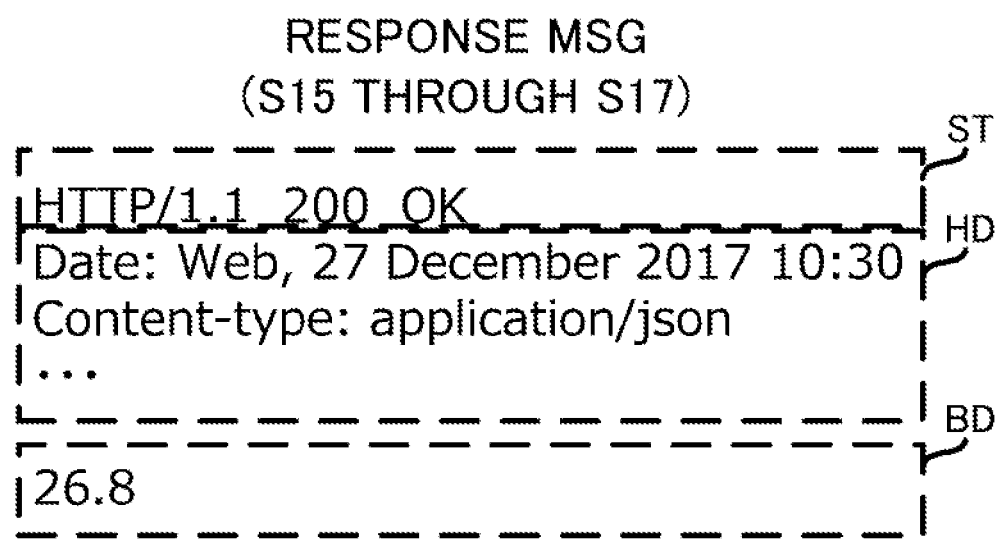
FIG. 14 illustrates a response message.

FIG. 14 illustrates a response MSG (S15 through S17). The response MSG (S15 through S17) includes a status line ST, a message header HD, and a message body BD. The message body BD includes the measurement data of temperature "26.8".

The IoT server 4 acquires the measurement data of temperature by receiving the response MSG (S17). The control sequence SQ2 is executed in the above-described manner.

As described above, in the relaying server 1, the device definition information acquisition unit 101 acquires, from the gateway device 2, the URL in the Internet of the network resource (measurement data of temperature) provided from the IoT device 3 to the IoT server 4 through the gateway device 2. The URL storing unit 102 relates the GWID corresponding to the GW address included in the URL to the URL.

In addition, the URL conversion unit 104 receives, from the IoT server 4, the device control MSG (S9) for the IoT device 3, and detects the URL corresponding to the GWID specified in the device control MSG (S9) from the correspondence relationship between the GWID and the URL. The relay processing unit 105 relays the device control MSG (S11) to the IoT device 3 through the gateway device 2 in accordance with the URL detected by the URL conversion unit 104.

The above described configuration allows the relaying server 1 to detect the URL corresponding to the IoT device 3 on the basis of the correspondence relationship between the GWID and the URL with use of the GWID specified in the device control MSG (S9), and relay the device control MSG (S11) in accordance with the detected URL without informing the IoT server 4 of the GW address. Therefore, the GW address is inhibited from leaking out from the IoT server 4 to a malicious user, and the IoT device 3 is inhibited from being attacked through the gateway device 2.

Therefore, the relaying server 1 is able to reduce the security risk in the relay processing. The relaying method of the embodiment is a method implemented by the operation of the above-described relaying server 1. Thus, the relaying method of the embodiment achieves the same advantages as the above-described advantages.

In addition, in the relaying server 1, the device definition information acquisition unit 101 acquires the attribute ID, the device ID, and the URL from the gateway device 2. The URL storing unit 102 relates the attribute ID, the device ID, and the GWID to the URL. The URL conversion unit 104 detects the URL corresponding to the attribute ID, the device ID, and the GWID specified in the device control MSG (S9) from the correspondence relationship between the attribute ID, the device ID, and the GWID and the URL.

Thus, the relaying server 1 is able to determine the URL in accordance with the attribute of the network resource and the designation of the IoT device 3. For example, when the number of the kinds of network resource is one, the attribute ID may not be necessarily specified in the device control MSG (S9).

In addition, the structure of the device definition information included in the message S4 of the above described storing sequence SQ is a data structure of the embodiment. This device definition information is storing data stored in the relaying server 1 from the gateway device 2, and includes the device ID to identify the IoT device 3, and the URL in the Internet of the network resource provided from the IoT device 3 to the IoT server 4 through the gateway device 2.

The device definition information is used in the process in which the relaying server 1 relates the GWID corresponding to the GW address included in the URL to the URL and the device ID. In addition, the device definition information is used in the process for detecting the URL corresponding to the GWID and the device ID specified in the device control MSG (S9) from the correspondence relationship between the GWID, the URL, and the device ID when the device control MSG (S9) for the IoT device 3 is received from the IoT server 4. Furthermore, the device definition information is used in the process for relaying the device control MSG (S9) to the IoT device 3 through the gateway device 2 in accordance with the detected URL.

Therefore, the data structure of the embodiment reduces the security risk in the relay processing.

As described above, in the gateway device 2, the device definition information acquisition unit 201 acquires, from IoT device 3, the URL "http://192.168.1.10/Things/Property/temp" in the LAN of the network resource, which is provided from the IoT device 3 to the IoT server 4 through the gateway device 2, and the device ID "device1" to identify the IoT device 3. The URL storing unit 202 relates the device ID "device1" to the URL "http://192.168.1.10/Things/Property/temp".

The operation control unit 200 generates, from the URL "http://192.168.1.10/Things/Property/temp", the URL "http://gw1.exp.global.com/Things/device1/Property/temperature" in the Internet of the network resource. The URL "http://192.168.1.10/Things/Property/temp" is an example of a first resource identifier, and the URL "http://gw1.exp.global.com/Things/device1/Property/temperature" is an example of a second resource identifier.

The URL conversion unit 204 receives, from the IoT server 4, the device control MSG (S11) for the IoT device 3 on the basis of the URL in the Internet. The URL conversion unit 204 detects the URL corresponding to the device ID specified in the device control MSG (S11) from the correspondence relationship between the device ID and the URL. The relay processing unit 205 relays the device control MSG (S13) to the IoT device 3 in accordance with the URL detected by the URL conversion unit 104.

The above described configuration allows the gateway device 2 to detect the URL corresponding to the device ID on the basis of the correspondence relationship between the device ID and the URL and relay the control MSG (S11) to the IoT device 3 in accordance with the detected URL. Therefore, the gateway device 2 is able to relay the control MSG (S11) to the IoT device 3 in conjunction with the above described relaying server 1.

That is, the relaying server 1 converts the URL "http://center.com/gw1/Things/device1/Property/temperature" of the device control MSG (S9) received from the IoT server 4 to the URL "http://gw1.exp.global.com/Things/device1/Property/temperature" on the basis of the GWID "gw1". The gateway device 2 converts the URL "http://gw1.exp.global.com/Things/device1/Property/temperature" of the device control MSG (S11) received from the relaying server 1 to the URL "http://192.168.1.10/Things/Property/temp" on the basis of the device ID "device1". This configuration makes it possible to access the IoT device 3 in the LAN from the IoT server 4 in the Internet.

The present example has described a case where an Internet Protocol version 4 (IPv4) address or the host name corresponding to the IPv4 address is used as the address in the URL, but does not intend to suggest any limitation. An Internet Protocol version 6 (IPv6) address may be used.

FIG. 15 illustrates another example of the message S1 of the device definition information transmitted from the IoT device 3. The address "fe80::ed87:66e3:4fb2:3a6g" in the URL is the IPv6 address of the IoT device 3. On the other hand, in FIG. 5, the IPv4 address "192.168.1.10" of the IoT device 3 is presented as the address in the URL.

FIG. 16 illustrates another example of the URL conversion table 230 of the gateway device 2. The URL including the above described IPv6 address "fe80::ed87:66e3:4fb2:3a6g" is stored in the URL conversion table 230. On the other hand, the IPv4 address "192.168.1.10" is stored, as the address in the URL, in the URL conversion table 230 illustrated in FIG. 6.

FIG. 17 illustrates another example of the device definition information stored in the device definition information DB 231 of the gateway device 2. The URL including the IPv6 local address (the address in the LAN) "fe80::ed87:66e3:4fb2:2b4f" of the gateway device 2 is stored in the device definition information DB 231. On the other hand, in FIG. 7, the URL including the host name "gw1.exp.com" corresponding to the local address of the gateway device 2 is presented.

FIG. 18 illustrates another example of the message S4 of the device definition information transmitted from the gateway device 2. The URL including the IPv6 global address (the address in the Internet) "2001:db8::fedc:ba98:7654:3210" of the gateway device 2 is stored in the device definition information. On the other hand, in FIG. 8, the URL including the host name "gw1.exp.global.com" corresponding to the global address of the gateway device 2 is presented.

FIG. 19 illustrates another example of the URL conversion table 130 and the GWID-DB 132 of the relaying server 1. The URL including the IPv6 global address "2001:db8::fedc:ba98:7654:3210" of the gateway device 2 is stored in the URL conversion table 130. The IPv6 global address "2001:db8::fedc:ba98:7654:3210" of the gateway device 2 is stored as the GW address in the GWID-DB 132.

On the other hand, in FIG. 9, the URL conversion table 130 in which the URL including the host name "gw1.exp.global.com" corresponding to the global address of the gateway device 2 and the GWID-DB 132 in which the host name "gw1.exp.global.com" is stored as the GW address are presented.

FIG. 20 illustrates another example of the device definition information stored in the device definition information DB 131 of the relaying server 1. The URL including the IPv6 global address (the address in the Internet) "2001:db8::123:4567:89ab:cdef" of the relaying server 1 is stored in the device definition information DB 131. On the other hand, in FIG. 10, the URL including the host name "center.com" corresponding to the global address of the relaying server 1 is presented.

FIG. 21 illustrates another example of the device control MSG (S9) transmitted from the IoT server 4. The URL including the IPv6 global address "2001:db8::123:4567:89ab:cdef" of the relaying server 1 is specified in the device control MSG (S9). On the other hand, the URL including the host name "center.com" corresponding to the global address of the relaying server 1 is specified in the device control MSG (S9) illustrated in FIG. 11.

FIG. 22 illustrates another example of the device control MSG (S11) transmitted form the relaying server 1. The URL including the IPv6 global address "2001:db8::fedc:ba98:7654:3210" of the gateway device 2 is specified in the device control MSG (S11). On the other hand, the URL including the host name "gw1.exp.global.com" corresponding to the global address of the gateway device 2 is specified in the device control MSG (S11) illustrated in FIG. 12.

FIG. 23 illustrates another example of the device control MSG (S13) transmitted from the gateway device 2. The URL including the IPv6 local address "fe80::ed87:66e3:4fb2:3a6g" of the IoT device 3 is specified in the device control MSG (S13). On the other hand, the URL including the IPv4 local address "192.168.1.10" of the IoT device 3 is specified in the device control MSG (S13) illustrated in FIG. 13.

Next, the operation of the relaying system will be described with use of an example of an access along the path Rb presented in FIG. 1. In this operation, the GWID is included in the device definition information. Thus, the relaying server 1 does not use the GWID-DB 132.

Figure 24:
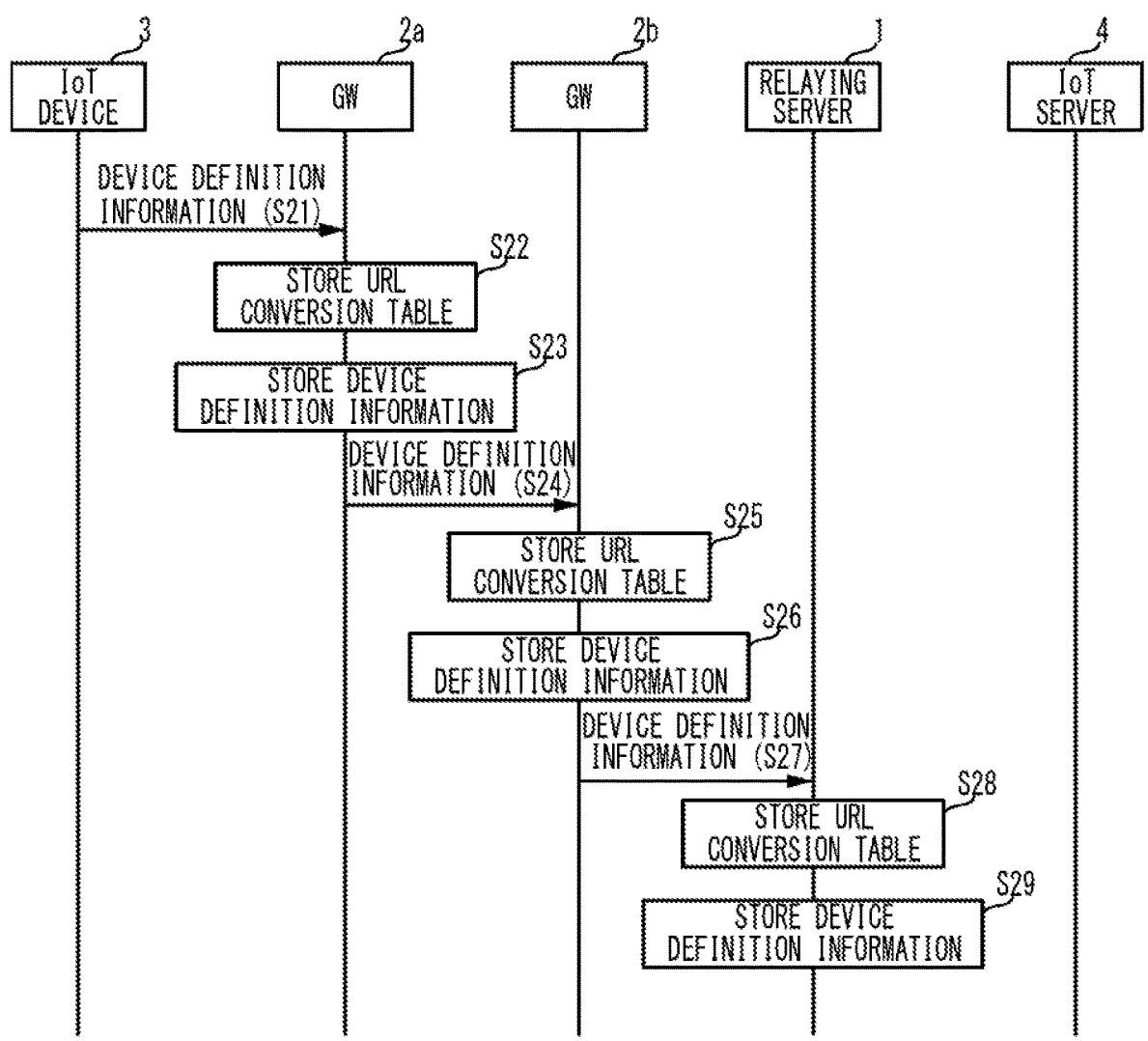
FIG. 24 is a sequence diagram illustrating a storing process of the device definition information of the IoT device in the gateway device and the relaying server.

FIG. 24 is a sequence diagram illustrating a storing process of the device definition information of the IoT device 3 in the gateway devices 2a and 2b and the relaying server 1. This process corresponds to the storing sequence SQ1 in FIG. 4. Hereinafter, with reference to FIG. 25 through FIG. 31 as appropriately, the storing sequence SQ1 will be described.

The IoT device 3 transmits a message S21 including the device definition information to the gateway device 2a. The message S21 including the device definition information transmitted from the IoT device 3 is as illustrated in FIG. 5.

Then, in the gateway device 2a, the device definition information acquisition unit 201 acquires the device definition information in the message S21 from the IoT device 3. The URL storing unit 202 relates the device ID "device1" and the attribute ID "temperature" of the device definition information to the URL "http://192.168.1.10/Things/Property/temp", and stores the correspondence relationship in the URL conversion table 230 (reference character S22). The URL conversion table 230 is as illustrated in FIG. 6.

Then, the device storing unit 203 of the gateway device 2a stores the device definition information in the device definition information DB 231 (reference character S23).

FIG. 25 illustrates the device definition information stored in the device definition information DB 231 of the gateway device 2a. The device definition information DB 231 includes the device definition information including, as indicated by dotted-line frames, the device ID "device1", the attribute ID "temperature", and the URL "http://gw2.exp.com/Things/device1/Property/temperature". Here, "gw2.exp.com" included in the URL is the local address in the LAN of the gateway device 2a.

In the above described manner, the device storing unit 203 changes the address part of the URL acquired from the IoT device 3 from the local address "192.168.1.10" of the IoT device 3" to the local address "gw2.exp.com" of the gateway device 2a, and stores the device definition information in which the address part of the URL has been changed.

Then, the operation control unit 200 of the gateway device 2a transmits a message S24 including the device definition information to the gateway device 2b located in the upper node.

FIG. 26 illustrates the message S24 including the device definition information transmitted from the gateway device 2b. The message S24 includes a request line RQ, a message header HD, and a message body BD.

The message body BD includes the device definition information including, as indicated by dotted-line frames, the GWID "gw2", the device ID "device1", the attribute ID "temperature", and the URL "http://gw2.exp.global.com/Things/device1/Property/temperature". Here, "gw2.exp.global.com" included in the URL is the global address in the Internet of the gateway device 2a.

The operation control unit 200 changes the address part of the stored URL from the local address "gw2.exp.com" to the global address "gw2.exp.global.com" in the message S24 to enable the access from the gateway device 2b located in the upper node. In addition, the operation control unit 200 inserts the GWID "gw2" corresponding to the global address "gw2.exp.global.com" to the message S24. In the above described manner, the operation control unit 200 generates, from the URL obtained from the IoT device 3, the URL indicating the location in the Internet of the network resource with reference to the gateway device 2a.

In the gateway device 2b, the device definition information acquisition unit 201 acquires the device definition information in the message S24 from the gateway device 2a located in the lower node. The URL storing unit 202 relates the GWID "gw1", the device ID "device1", and the attribute ID "temperature" of the device definition information to the URL "http://gw2.exp.global.com/Things/device1/Property/temperature", and stores the correspondence relationship in the URL conversion table 230 (reference character S25).

FIG. 27 illustrates the URL conversion table 230 of the gateway device 2b. The device ID, the GWID, and the attribute ID are related to the URL and stored in the URL conversion table 230.

Then, the device storing unit 203 of the gateway device 2b stores the device definition information in the device definition information DB 231 (reference character S26).

FIG. 28 illustrates the device definition information stored in the device definition information DB 231 of the gateway device 2b. The device definition information DB 231 includes the device definition information including, as indicated by dotted-line frames, the device ID "device1", the attribute ID "temperature", and the URL "http://gw1.exp.com/gw2/Things/device1/Property/temperature". Here, "gw1.exp.com" included in the URL is the local address in the LAN of the gateway device 2b. In addition, "gw2" included in the URL is the GWID of the gateway device 2a located in the lower node.

Then, the operation control unit 200 of the gateway device 2b transmits a message S27 including the device definition information to the relaying server 1.

FIG. 29 illustrates the message S27 including the device definition information transmitted from the gateway device 2b. The message S27 includes a request line RQ, a message header HD, and a message body BD.

The message body BD includes the device definition information including, as indicated by dotted-line frames, the GWID "gw1gw2", the device ID "device1", the attribute ID "temperature", and the URL "http://gw1.exp.global.com/gw2/Things/device1/Property/temperature". Here, "gw1.exp.global.com" included in the URL is the global address in the Internet of the gateway device 2a. In addition, "gw2" included in the URL is the GWID of the gateway device 2a located in the lower node.

The operation control unit 200 changes the address part of the stored URL from the local address "gw1.exp.com" to the global address "gw1.exp.global.com" in the message S27 to enable the access from the relaying server 1. In addition, the operation control unit 200 inserts the GWID "gw1gw2", which corresponds to the combination of the global address "gw1.exp.global.com" and "gw2", to the message S27. In the above described manner, the operation control unit 200 generates, from the URL acquired from the IoT device 3, the URL indicating the location in the Internet of the network resource with reference to the gateway device 2b.

In the relaying server 1, the device definition information acquisition unit 101 acquires the device definition information in the message S27 from the gateway device 2b. The URL storing unit 102 relates the GWID "gw1 gw2", the device D "device1", and the attribute ID "temperature" of the device definition information to the URL "http:/gw1.exp.global.com/gw2/Things/device/Property/temperature", and stores the correspondence relationship in the URL conversion table 130 (reference character S28).

FIG. 30 illustrates the URL conversion table 130 of the relaying server 1. The device ID, the GWID, and the attribute ID are related to the URL and stored in the URL conversion table 130. On the basis of the device definition information in the message S27, the device ID "device1", the GWID "gw1gw2", and the attribute ID "temperature" are related to the URL "http://gw1.exp.global.com/gw2/Things/Property/temperature".

Here, the GWID "gw1gw2" is a value corresponding to the combination of the global address "gw1.exp.global.com" and "gw2". Thus, the relaying server 1 is able to manage the GWID corresponding to the combination of the gateway devices 2a and 2b on the path Rb.

Then, the device storing unit 103 stores the device definition information in the device definition information DB 131 (reference character S29). The device storing unit 103 rewrites the URL with use of the address in the Internet of the relaying server 1 and the GWID to enable the access from the IoT server 4.

FIG. 31 illustrates the device definition information stored in the device definition information DB 131 of the relaying server 1. The device definition information DB 131 includes the device definition information including, as indicated by dotted-line frames, the device ID "device1", the attribute ID "temperature", and the URL "http://center.com/gw1gw2/Things/device1/Property/temperature".

Here, "center.com" included in the URL is the address in the Internet of the relaying server 1. In addition, "gw1gw2" included in the URL is the GWID corresponding to the combination of the global address "gw1.exp.global.com" of the gateway device 2b and the GWID "gw2" of the gateway device 2b.

As described above, the device storing unit 103 changes the address part of the URL acquired from the gateway device 2b from the GW address "gw1.exp.global.com" to the address "center.com" of the relaying server 1 and the GWID "gw1gw2", and stores the device definition information in which the address part of the URL has been changed. Thus, the device storing unit 103 is able to define the URL of the network resource by the path using the GWID with reference to the relaying server 1. In the above described manner, the storing sequence SQ1 is executed.

Then, the control sequence SQ2 in which the IoT server 4 requests the network resource (measurement data of temperature) from the IoT device 3 and acquires the network resource (measurement data of temperature) from the IoT device 3 is executed.

Figure 32:
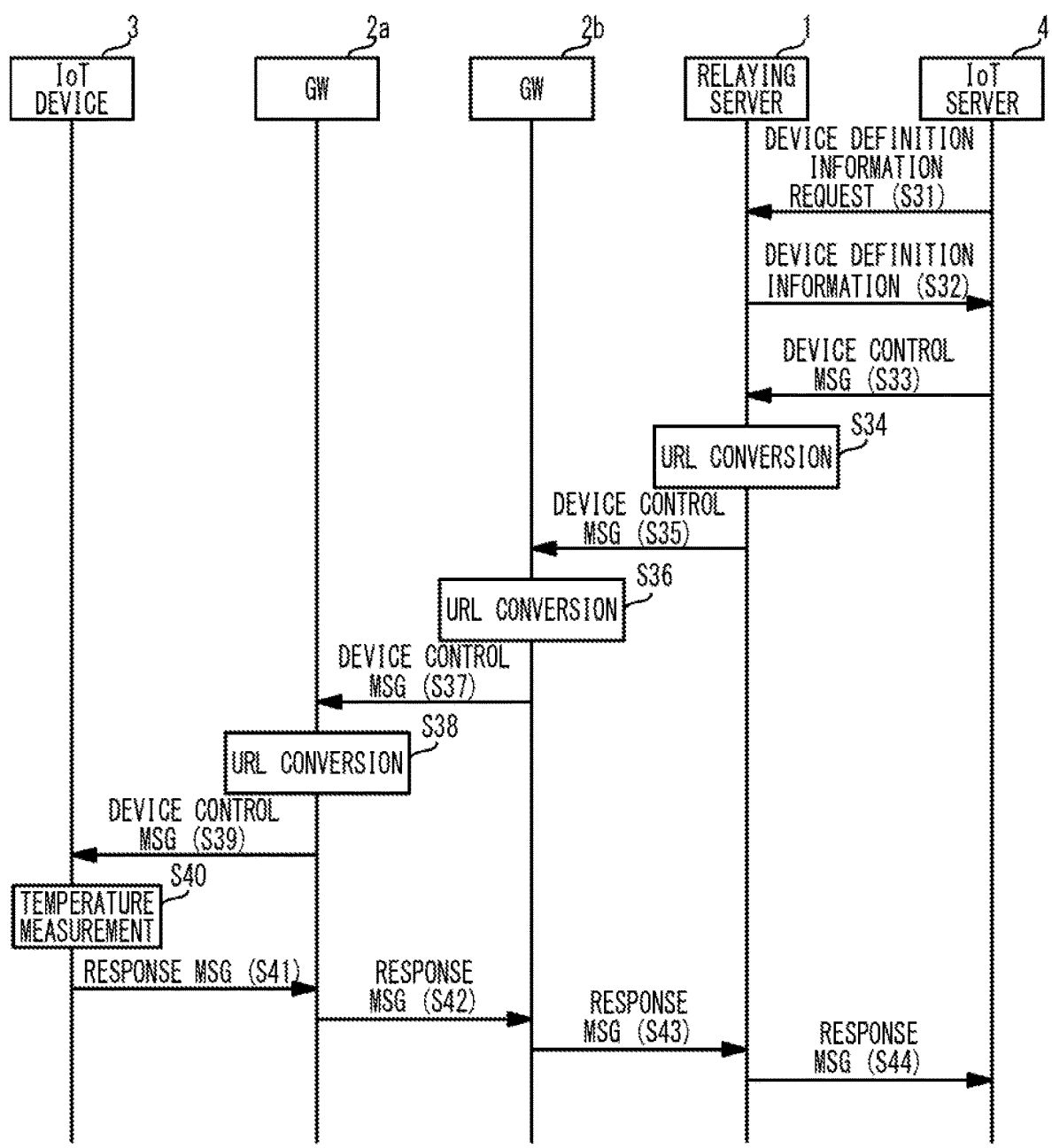
FIG. 32 is a sequence diagram illustrating a network resource request process from the IoT server to the IoT device and a network resource acquisition process.

FIG. 32 is a sequence diagram illustrating a network resource request process from the IoT server 4 to the IoT device 3 and a network resource acquisition process. Hereinafter, with reference to FIG. 33 through FIG. 36 as appropriately, the control sequence SQ2 will be described.

The IoT server 4 transmits a message S31 that requests the device definition information of the IoT device 3 to the relaying server 1 prior to the request for the network resource. In the relaying server 1, the operation control unit 100 transmits a message S32 including the device definition information to the IoT server 4 in response to the message S31. The device definition information in the message S32 is as illustrated in FIG. 31.

Then, the IoT server 4 transmits a device control MSG (S33) to the relaying server 1 on the basis of the device definition information in the message S32 received from the relaying server 1.

FIG. 33 illustrates the device control MSG (S33) transmitted from the IoT server 4. The device control MSG (S33) includes the URL "http://center.com/gw1gw2/Things/device1/Property/temperature" identical to the URL illustrated in FIG. 31, as indicated by a dotted-line frame.

The relaying server 1 converts the URL of the device control MSG (S33) in accordance with the URL conversion table 130 (reference character S34). When receiving the device control MSG (S33), the URL conversion unit 104 acquires the GWID, the device ID, and the attribute ID specified in the device control MSG (S33). More specifically, the URL conversion unit 104 acquires the GWID "gw1 gw2", the device ID "device1", and the attribute ID "temperature" from the URL "http://center.com/gw1gw2/Things/device1/Property/temperature" of the device control MSG (S33).

The URL conversion unit 104 retrieves the URL "http://gw1.exp.global.com/gw2/Things/device1/Property/temperature" corresponding to the GWID "gw1gw2", the device ID "device1", and the attribute ID "temperature" from the URL conversion table 130. Through this process, the URL conversion unit 104 converts the URL of the device control MSG (S33). Then, the relay processing unit 105 generates a new device control MSG (S35) by replacing the URL of the device control MSG (S33) with the converted URL, and transmits the device control MSG (S35) to the gateway device 2b.

FIG. 34 illustrates the device control MSG (S35) transmitted from the relaying server 1. The converted URL "http://gw1.exp.global.com/gw2/Things/device1/Property/temperature" is specified in the device control MSG (S35).

The gateway device 2b converts the URL of the device control MSG (S35) in accordance with the URL conversion table 230 (reference character S36). When receiving the device control MSG (S35), the URL conversion unit 204 acquires the GWID, the device ID, and the attribute ID specified in the device control MSG (S35). More specifically, the URL conversion unit 204 acquires the GWID "gw2", the device ID "device1", and the attribute ID "temperature" from the URL "http://gw1.exp.global.com/gw2/Things/device1/Property/temperature" of the device control MSG (S35).

The URL conversion unit 204 retrieves the URL "http://gw2.exp.global.com/Things/device1/Property/temperature" corresponding to the GWID "gw2", the device ID "device1", and the attribute ID "temperature" from the URL conversion table 230. Through this process, the URL conversion unit 204 converts the URL of the device control MSG (S35). Then, the relay processing unit 205 generates a new device control MSG (S37) by replacing the URL of the device control MSG (S35) with the converted URL, and transmits the device control MSG (S37) to the gateway device 2a.

FIG. 35 illustrates the device control MSG (S37) transmitted from the gateway device 2b. The converted URL "http://gw2.exp.global.com/Things/device1/Property/temperature" is specified in the device control MSG (S37).

The gateway device 2a converts the URL of the device control MSG (S37) in accordance with the URL conversion table 230 (reference character S38). When receiving the device control MSG (S37), the URL conversion unit 204 acquires the device ID and the attribute ID specified in the device control MSG (S37). More specifically, the URL conversion unit 204 acquires the device ID "device1" and the attribute ID "temperature" from the URL "http://gw2.exp.global.com/Things/device1/Property/temperature" of the device control MSG (S37).

The URL conversion unit 204 retrieves the URL "http://192.168.1.10/Things/device1/Property/temp" corresponding to the device ID "device1" and the attribute ID "temperature" from the URL conversion table 230. Through this process, the URL conversion unit 204 converts the URL of the device control MSG (S37). Then, the relay processing unit 205 generates a new device control MSG (S39) by replacing the URL of the device control MSG (S37) with the converted URL, and transmits the device control MSG (S39) to the IoT device 3.

FIG. 36 illustrates the device control MSG (S39) transmitted from the gateway device 2a. The converted URL "http://192.168.1.10/Things/Property/temp" is specified in the device control MSG (S39).

When receiving the device control MSG (S39), the IoT device 3 measures temperature (reference character S40). The IoT device 3 generates a response message (MSG) S41 including measurement data of temperature, and transmits the response MSG (S41) to the gateway device 2a. In response to the reception of the response MSG (S41), the gateway device 2a transmits a response MSG (S42) to the gateway device 2b located in the upper node. In response to the reception of the response MSG (S42), the gateway device 2b transmits a response MSG (S43) to the relaying server 1. In response to the reception of the response MSG (S43), the relaying server 1 transmits a response MSG (S44) to the IoT server 4.

The IoT server 4 acquires the measurement data of temperature by receiving the response MSG (S44). The response MSG (S41 through S44) is as illustrated in FIG. 14. In the above described manner, the control sequence SQ2 is executed.

As described above, the gateway device 2a located in the lower node acquires, from the IoT device 3, the URL "http://192.168.1.0/Things/Property/temp" in the LAN of the network resource, which is provided to the IoT server 4 from the IoT device 3 through the two gateway devices 2a and 2b, and the device ID "device1". The gateway device 2a relates the device ID "device1" to the URL "http://192.168.1.10/Things/Property/temp". The URL "http://192.168.1.10/Things/Property/temp" is an example of a first resource identifier.

The gateway device 2a generates, from the device ID "device1" and the URL "http://192.168.1.10/Property/temp", the URL "http://gw1.exp.global.com/Things/device1/Property/temperature" in the Internet of the network resource with reference to the gateway device 2a. The URL "http://gw1.exp.global.com/Things/device1/Property/temperature" is an example of a second resource identifier.

The gateway device 2b located in the upper node acquires the URL "http://gw1.exp.global.com/Things/device1/Property/temperature" from the gateway device 2a located in the lower node, and relates the GWID "gw1" corresponding to the GW address "gw1.exp.global.com" of the gateway device 2a included in the URL to the URL. The gateway device 2b generates, from the GWID "gw1" and the URL "http://gw1.exp.global.com/Things/device1/Property/temperature", the URL "http://gw1.exp.global.com/gw2/Things/device1/Property/temperature" in the Internet of the network resource with reference to the gateway device 2b. The GWID "gw1" is an example of a first gateway identifier, and the URL "http://gw1.exp.global.com/gw2/Things/device1/Property/temperature" is an example of a third resource identifier.

The relaying server 1 acquires the URL "http://gw1.exp.global.com/gw2/Things/device1/Property/temperature" from the gateway device 2b. The relaying server 1 relates the GWID "gw1gw2", which corresponds to the combination of the GWID "gw2" included in the URL "http://gw1.exp.global.com/gw2/Things/device1/Property/temperature" and the GW address "gw1.exp.global.com" of the gateway device 2*b*, to the URL "http://gw1.exp.global.com/gw2/Things/device/Property/temperature". The GWID "gw1gw2" is an example of a second gateway identifier.

The relaying server 1 receives, from the IoT server 4, the request for the network resource to the IoT device 3. The relaying server 1 detects the URL "http://gw1.exp.global.com/gw2/Things/device1/Property/temperature" corresponding to the GWID "gw1 gw2" specified in the device control MSG (S33) from the correspondence relationship between the GWID and the URL. The relaying server 1 relays the device control MSG (S35) to the gateway device 2*b* in accordance with the detected URL "http://gw1.exp.global.com/gw2/Things/device1/Property/temperature".

The gateway device 2*b* receives the device control MSG (S35) from the relaying server 1. The gateway device 2*b* detects the URL "http://gw2.exp.global.com/Things/device1/Property/temperature" corresponding to the GWID "gw2" in the URL specified in the device control MSG (S35) from the correspondence relationship between the GWID and the URL. The gateway device 2*b* relays the device control MSG (S37) to the gateway device 2*a* located in the lower node in accordance with the detected URL "http://gw2.exp.global.com/Things/device1/Property/temperature".

The gateway device 2*a* receives the device control MSG (S37) from the gateway device 2*b* located in the upper node. The gateway device 2*a* detects the URL "http://192.168.1.10/Things/Property/temp" corresponding to the device ID "device1" in the URL "http://gw2.exp.global.com/Things/device1/Property/temperature" specified in the device control MSG (S37) from the correspondence relationship between the device ID and the URL. The gateway device 2*a* relays the device control MSG (S39) to the IoT device 3 in accordance with the detected URL "http://192.168.1.10/Things/Property/temp".

Thus, the IoT server 4 is able to access the network resource (measurement data of temperature) of the IoT device 3 through the relaying server 1 and the two gateway devices 2*a* and 2*b*. In addition, the relaying server 1 is able to detect the URL corresponding to the IoT device 3 with use of the GWID specified in the device control MSG (S33) on the basis of the correspondence relationship between the GWID and the URL and relay the device control MSG (S35) in accordance with the detected URL without informing the IoT server 4 of the GW address.

Thus, the GW addresses of the gateway devices 2*a* and 2*b* are inhibited from leaking out from the IoT server 4 to a malicious user, and the IoT device 3 is inhibited from being attacked through the gateway devices 2*a* and 2*b*. Therefore, the relaying server 1 is able to reduce the security risk in the relay processing.

In the above described embodiments, the URL has been described as the resource identifier indicating the location of the network resource of the IoT device 3, but this does not intend to suggest any limitation. Other identifiers may be used. However, the use of the URL allows the communication between the IoT server 4 and the IoT device 3 to be executed through a Web interface.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A relaying apparatus comprising:
   a memory; and
   a processor coupled to the memory and configured to:
      acquire a resource identifier for a network resource from a gateway device that transmits the resource identifier to the relaying apparatus, the network resource being provided from a device in a first network to a server in a second network through the gateway device, the resource identifier indicating a location in the second network of the network resource, the gateway device generating the resource identifier from another resource identifier indicating a location in the first network of the network resource, the another resources identifier being transmitted from the device to the gateway device,
      relate a gateway identifier corresponding to an address of the gateway device included in the resource identifier to the resource identifier to generate a correspondence relationship between the gateway identifier and the resource identifier,
      receive, from the server, a request for the network resource to the device,
      detect, from the correspondence relationship, the resource identifier corresponding to the gateway identifier specified in the request, and
      relay the request to the device through the gateway device in accordance with the resource identifier that has been detected from the correspondence relationship.

2. The relaying apparatus according to claim 1, wherein the processor is further configured to:
   store the correspondence relationship between the gateway identifier and the resource identifier in a table, and
   detect, from the table, the resource identifier corresponding to the gateway identifier specified in the request.

3. The relaying apparatus according to claim 1, wherein the processor is further configured to:
   acquire, from the gateway device, a device identifier to identify the device and the resource identifier,
   relate the device identifier and the gateway identifier to the resource identifier to generate the correspondence relationship between the device identifier the gateway identifier and the resource identifier, and
   detect the resource identifier corresponding to the device identifier and the gateway identifier, which are specified in the request, from the correspondence relationship between the device identifier and the gateway identifier and the resource identifier.

4. The relaying apparatus according to claim 3, wherein the processor is further configured to:
   acquire, from the gateway device, an attribute identifier to identify an attribute of the network resource, the device identifier, and the resource identifier,
   relate the attribute identifier, the device identifier, and the gateway identifier to the resource identifier to generate the correspondence relationship between the attribute identifier, the device identifier, and the gateway identifier and the resource identifier, and detect the resource identifier corresponding to the attribute identifier, the device identifier, and the gateway identifier, which are specified in the request, from the correspondence relationship between the attribute identifier, the device identifier, and the gateway identifier and the resource identifier.

5. The relaying apparatus according to claim 1, wherein the resource identifier is an URL.

6. A relaying method comprising:
acquiring a resource identifier for a network resource from a gateway device that transmits the resource identifier to a relaying apparatus, the network resource being provided from a device in a first network to a server in a second network through the gateway device, the resource identifier indicating a location in the second network of the network resource, the gateway device generating the resource identifier from another resource identifier indicating a location in the first network of the network resource, the another resources identifier being transmitted from the device to the gateway device,
relating a gateway identifier corresponding to an address of the gateway device included in the resource identifier to the resource identifier to generate a correspondence relationship between the gateway identifier and the resource identifier,
receiving, from the server, a request for the network resource to the device,
detecting, from the correspondence relationship, the resource identifier corresponding to the gateway identifier specified in the request, and
relaying the request to the device through the gateway device in accordance with the resource identifier that has been detected from the correspondence relationship.

7. The relaying method according to claim 6, further comprising:
storing the correspondence relationship between the gateway identifier and the resource identifier in a table, and
detecting, from the table, the resource identifier corresponding to the gateway identifier specified in the request.

8. The relaying method according to claim 6, further comprising:
acquiring, from the gateway device, a device identifier to identify the device and the resource identifier,
relating the device identifier and the gateway identifier to the resource identifier to generate the correspondence relationship between the device identifier the gateway identifier and the resource identifier, and
detecting the resource identifier corresponding the device identifier and the gateway identifier, which are specified in the request, from the correspondence relationship between the device identifier and the gateway identifier and the resource identifier.

9. The relaying method according to claim 8, further comprising:
acquiring, from the gateway device, an attribute identifier to identify an attribute of the network resource, the device identifier, and the resource identifier,
relating the attribute identifier, the device identifier, and the gateway identifier to the resource identifier to generate the correspondence relationship between the attribute identifier, the device identifier, and the gateway identifier and the resource identifier, and detecting the resource identifier corresponding to the attribute identifier, the device identifier, and the gateway identifier, which are specified in the request, from the correspondence relationship between the attribute identifier, the device identifier, and the gateway identifier and the resource identifier.

10. The relaying method according to claim 6, wherein the resource identifier is an URL.

11. A relaying system comprising:
a gateway device configured to communicate with a device in a first network; and
a relaying apparatus configured to relay communication between a server in a second network and the device through the gateway device, wherein
the gateway device is further configured to:
acquire a first resource identifier for a network resource from the device that transmits the first resource identifier to the gateway device, the network resources provided from the device to the server through the gateway device, and a device identifier to identify the device, the first resource identifier indicating a location in the first network of the network resource,
relate the device identifier to the first resource identifier to generate first correspondence relationship between the device identifier and the first resource identifier,
generate, from the first resource identifier, a second resource identifier, which indicates a location in the second network of the network resource, and
transmit the second resource identifier to the relaying apparatus,
the relaying apparatus is further configured to:
acquire the second resource identifier from the gateway device,
relate a gateway identifier corresponding to an address of the gateway device included in the second resource identifier to the second resource identifier to generate second correspondence relationship between the gateway identifier and the resource identifier,
receive, from the server, a request for the network resource to the device,
detect, from the first correspondence relationship, the second resource identifier corresponding to the gateway identifier specified in the request,
relay the request to the gateway device in accordance with the second resource identifier that has been detected, and
the gateway device is further configured to:
receive the request from the relaying apparatus,
detect the first resource identifier corresponding to the device identifier specified in the request from the first correspondence relationship and
relay the request to the device in accordance with the first resource identifier that has been detected from the correspondence relationship.

12. The relaying system according to claim 11, wherein the relaying apparatus is further configured to:
store the correspondence relationship between the gateway identifier and the second resource identifier in a table, and
detect, from the table, the second resource identifier corresponding to the gateway identifier specified in the request.

13. The relaying system according to claim 11, wherein the first resource identifier and the second resource identifier are URLs.

* * * * *